US012659519B2

(12) United States Patent
Wu et al.

(10) Patent No.: US 12,659,519 B2
(45) Date of Patent: Jun. 16, 2026

(54) METHOD AND APPARATUS FOR APPLYING POST-PROCESSING TO AT LEAST ONE VIDEO ENCODER OUTPUT TO GENERATE OUTPUT BITSTREAM

(71) Applicant: MEDIATEK INC., Hsin-Chu (TW)

(72) Inventors: Tung-Hsing Wu, Hsinchu City (TW); Han-Liang Chou, Hsinchu City (TW); Chia-Yun Cheng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 31 days.

(21) Appl. No.: 18/793,979

(22) Filed: Aug. 5, 2024

(65) Prior Publication Data

US 2025/0063207 A1      Feb. 20, 2025

Related U.S. Application Data

(60) Provisional application No. 63/520,109, filed on Aug. 17, 2023.

(51) Int. Cl.
| | |
|---|---|
| *H04N 19/85* | (2014.01) |
| *H04N 19/13* | (2014.01) |
| *H04N 19/132* | (2014.01) |
| *H04N 19/172* | (2014.01) |
| *H04N 19/176* | (2014.01) |
| *H04N 19/186* | (2014.01) |
| *H04N 19/70* | (2014.01) |

(52) U.S. Cl.
CPC ............. *H04N 19/85* (2014.11); *H04N 19/13* (2014.11); *H04N 19/132* (2014.11); *H04N 19/172* (2014.11); *H04N 19/176* (2014.11); *H04N 19/186* (2014.11); *H04N 19/70* (2014.11)

(58) Field of Classification Search
CPC ...................................................... H04N 19/85
See application file for complete search history.

(56) References Cited

U.S. PATENT DOCUMENTS

| | | | | |
|---|---|---|---|---|
| 2006/0133493 | A1* | 6/2006 | Cho | ........................ H04N 19/46 348/42 |
| 2022/0286666 | A1* | 9/2022 | Zhu | ...................... H04N 19/176 |

* cited by examiner

*Primary Examiner* — Jerry T Jean Baptiste
(74) *Attorney, Agent, or Firm* — Winston Hsu

(57) ABSTRACT

A video processing apparatus includes a video encoding circuit and a post-processing circuit. The video encoding circuit receives a first source data, and encodes the first source data to generate a first bitstream, wherein the first source data includes a first source luminance channel data and a first source chrominance channel data, and the first bitstream includes a first compressed luminance channel data and a first compressed chrominance channel data. The post-processing circuit derives an auxiliary compressed chrominance channel data from an auxiliary input, and generates and outputs an output bitstream that includes the first compressed luminance channel data and the auxiliary compressed chrominance channel data.

20 Claims, 4 Drawing Sheets

METHOD AND APPARATUS FOR APPLYING POST-PROCESSING TO AT LEAST ONE VIDEO ENCODER OUTPUT TO GENERATE OUTPUT BITSTREAM

CROSS REFERENCE TO RELATED APPLICATIONS

This application claims the benefit of U.S. Provisional Application No. 63/520,109, filed on Aug. 17, 2023. The content of the application is incorporated herein by reference.

BACKGROUND

The present invention relates to video coding, and more particularly, to a method and apparatus for applying post-processing to one or more video encoder outputs to generate an output bitstream (e.g., a bitstream with a chroma subsampling format not supported by a hardware video encoder).

The conventional video coding standards generally adopt a block based coding technique to exploit spatial and temporal redundancy. For example, the basic approach is to divide a source frame into a plurality of blocks, perform intra/inter prediction on each block, transform residues of each block, and perform quantization and entropy encoding. In general, a source frame incudes luminance channel (Y) data and chrominance channel (U, V) data.

Chroma subsampling is a common practice of encoding frames by implementing less resolution for chrominance information than for luma information, taking advantage of the human visual system's lower acuity for color differences than for luminance. A hardware video encoder implemented in a system on a chip (SoC) may support a pre-defined chroma subsampling format. Thus, there is a need for an innovative design which is capable of allowing an SoC to generate an output bitstream with a chroma subsampling format not supported by the video encoder of the SoC.

SUMMARY

One of the objectives of the claimed invention is to provide a method and apparatus for applying post-processing to one or more video encoder outputs to generate an output bitstream (e.g., a bitstream with a chroma subsampling format not supported by a hardware video encoder).

According to a first aspect of the present invention, an exemplary video processing apparatus is disclosed. The exemplary video processing apparatus includes a video encoding circuit and a post-processing circuit. The video encoding circuit is configured to receive a first source data, and encode the first source data to generate a first bitstream, wherein the first source data comprises a first source luminance channel data and a first source chrominance channel data, and the first bitstream comprises a first compressed luminance channel data and a first compressed chrominance channel data. The post-processing circuit is configured to derive an auxiliary compressed chrominance channel data from an auxiliary input, and generate and output an output bitstream that comprises the first compressed luminance channel data and the auxiliary compressed chrominance channel data.

According to a second aspect of the present invention, an exemplary video processing method is disclosed. The video processing method includes: receiving a first source data; encoding the first source data to generate a first bitstream, wherein the first source data comprises a first source luminance channel data and a first source chrominance channel data, and the first bitstream comprises a first compressed luminance channel data and a first compressed chrominance channel data; deriving an auxiliary compressed chrominance channel data from an auxiliary input; and generating and outputting an output bitstream that comprises the first compressed luminance channel data and the auxiliary compressed chrominance channel data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
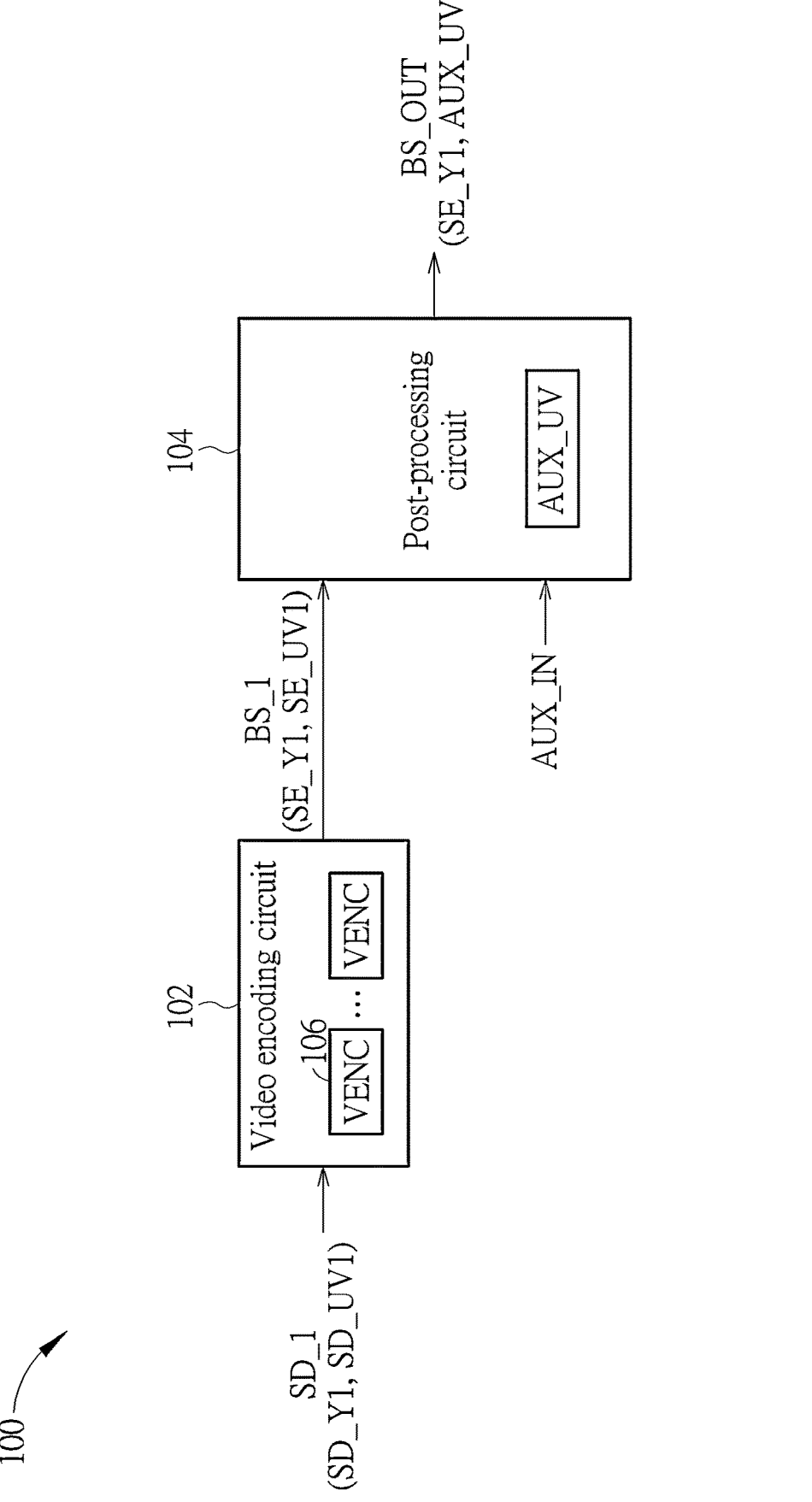
FIG. 1 is a diagram illustrating a video processing apparatus according to an embodiment of the present invention.

FIG. 1 is a diagram illustrating a video processing apparatus according to an embodiment of the present invention. By way of example, but not limitation, the video processing apparatus 100 may be implemented in an SoC. As shown in FIG. 1, the video processing apparatus 100 includes a video encoding circuit 102 and a post-processing circuit 104. The video encoding circuit 102 may include one or more hardware video encoders (labeled by "VENC") 106, depending upon actual design considerations. The video encoding circuit 102 is configured to receive a source data SD_1, and encode the source data SD_1 to generate a bitstream BS_1. The source data SD_1 may be obtained from a video source such as an image signal processor (ISP) of a camera system, and the bitstream BS_1 may be an entropy encoder output of one hardware video encoder. In this embodiment, the source data SD_1 includes a source luminance channel data SD_Y1 and a source chrominance channel data SD_UV1, and the bitstream BS_1 includes a compressed luminance channel data SE_Y1 and a compressed chrominance channel data SE UV1, where the compressed luminance channel data SE_Y1 is luminance syntax data (i.e., syntax elements obtained from video compression of the source luminance channel data SD_Y1) that is entropy encoded and carried by the bitstream BS_1, and the compressed chrominance channel data SE UV1 is chrominance syntax data (i.e., syntax elements obtained from video compression of the source chrominance channel data S_UV1) that is entropy encoded and carried by the bitstream BS_1. For example, the luminance syntax data may include syntax elements of at least one of intra/inter prediction mode, residual data and block partition data of the luminance channel Y, and the chrominance syntax data may include syntax elements of at least one of intra/inter prediction mode, residual data and block partition data of the chrominance channel UV.

The post-processing circuit 104 is configured to derive an auxiliary compressed chrominance channel data AUX_UV from an auxiliary input AUX_IN, and generate and output an output bitstream BS_OUT that includes the compressed luminance channel data SE_Y1 (which is carried by the bitstream BS_1) and the auxiliary compressed chrominance channel data AUX_UV. The auxiliary compressed chrominance channel data AUX_UV is chrominance syntax data that may include syntax elements of at least one of intra/inter prediction mode, residual data and block partition data of the chrominance channel UV. For example, the post-processing circuit 104 is configured to apply post-processing to the bitstream BS_1 for generating the output bitstream BS_OUT that is different from the bitstream BS_1 originally provided by the video encoding circuit 102 (particularly, hardware video encoder 106 of video encoding circuit 102). The post-processing performed by the post-processing circuit 104 may be hardware-based or software-based. That is, the post-processing circuit 104 may have dedicated hardware for dealing with the post-processing task, or may have a general-purpose processor for loading and executing a program code to deal with the post-processing task.

In some embodiments of the present invention, the video processing apparatus 100 may act as a video transcoding apparatus, and the post-processing task may include a video transcoding process. For example, hardware video encoder 106 of video encoding circuit 102 is designed to support a first chroma subsampling format and does not support a second chroma subsampling format. Hence, the source data SD_1 fed into hardware video encoder 106 of video encoding circuit 102 has the first chroma subsampling format. When there is a need to provide the output bitstream BS_OUT having the second chroma subsampling format, the post-processing circuit 104 is enabled to apply transcoding to the bitstream BS_1 (which has the first chroma subsampling format) for generating the output bitstream BS_OUT (which has the second chroma subsampling format). In this embodiment, the transcoding from one chroma subsampling format to another chroma subsampling format is achieved with the help of the auxiliary input AUX_IN. In one embodiment of the present invention, the auxiliary input AUX_IN may be a bitstream (e.g., an entropy encoder output) that carries the auxiliary compressed chrominance channel data (chrominance syntax data) AUX_UV. In another embodiment of the present invention, the auxiliary input AUX_IN may be another source data obtained from the same video source (e.g., ISP of camera system) that also provides the source data SD_1, and the auxiliary compressed chrominance channel data (chrominance syntax data) AUX_UV may be obtained from an encoding process of the auxiliary input AUX_IN.

For better comprehension of technical features of the video processing apparatus 100, several embodiments are described as below with reference to the accompanying drawings.

Figure 2:
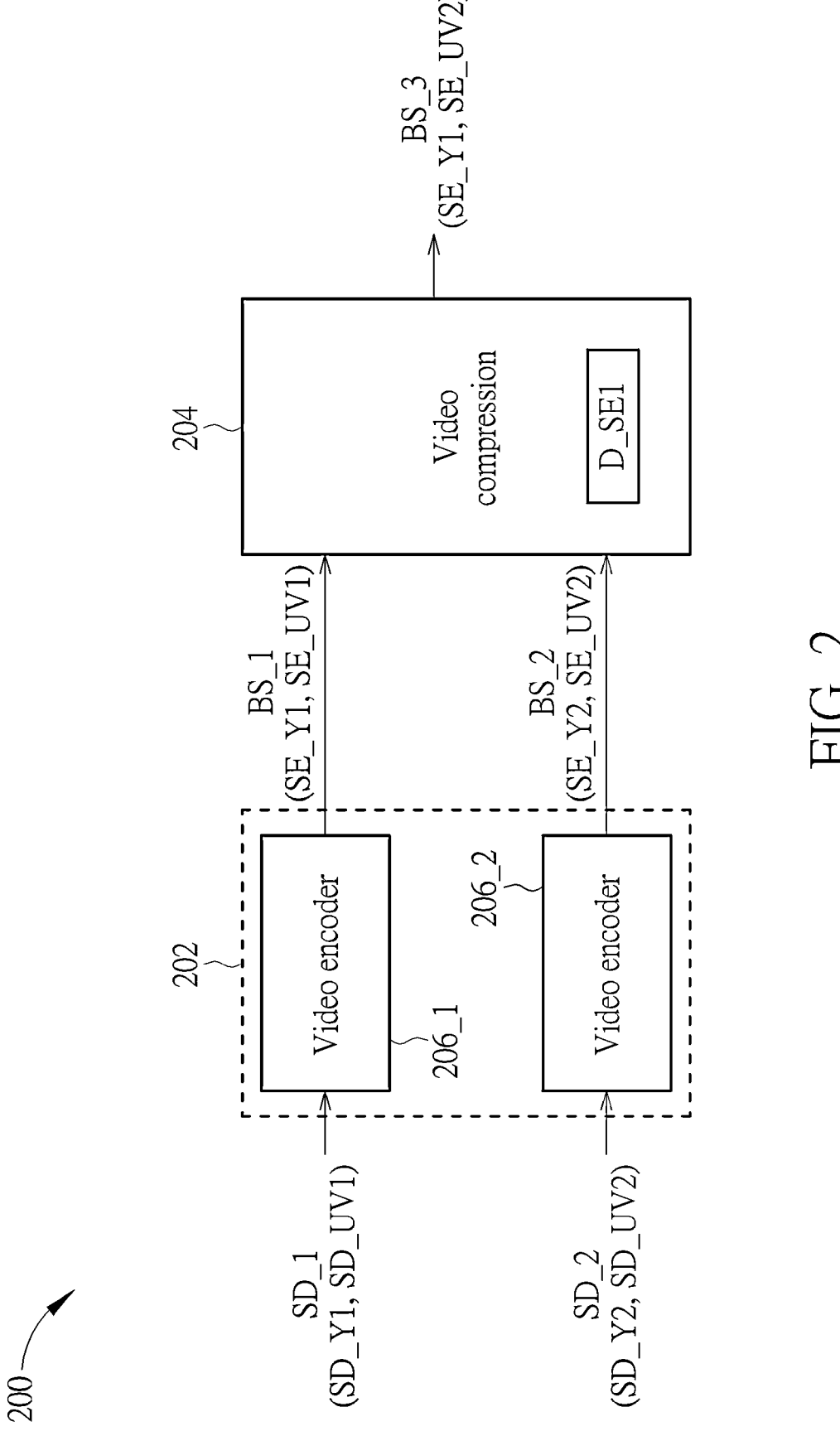
FIG. 2 is a diagram illustrating a first video processing apparatus capable of generating an output bitstream with a chroma subsampling format not supported by a hardware video encoder according to an embodiment of the present invention.

FIG. 2 is a diagram illustrating a first video processing apparatus capable of generating an output bitstream with a chroma subsampling format not supported by a hardware video encoder according to an embodiment of the present invention. The architecture of the video processing apparatus 200 is based on that of the video processing apparatus 100. As shown in FIG. 2, the video processing apparatus 200 includes a video encoding circuit 202 and a post-processing circuit (labeled by "video compression") 204. The video encoding circuit 102 shown in FIG. 1 may be implemented using the video encoding circuit 202, and the post-processing circuit 104 shown in FIG. 1 may be implemented using the post-processing circuit 204. The video encoding circuit 202 receives two source data SD_1 and SD_2, and encodes the source data SD_1 and SD_2 to generate two bitstreams BS_1 and BS_2, respectively. In this embodiment, the source data SD_1 and SD_2 have the same chroma subsampling format but different frame sizes (e.g., different frame widths and/or different frame heights). Both of the source data SD_1 and SD_2 may correspond to the same scene captured by a camera system, and may be obtained from the same ISP of the camera system. The source data SD_1 includes a source luminance channel data SD_Y1 and a source chrominance channel data SD_UV1, and the source data SD_2 includes a source luminance channel data SD_Y2 and a source chrominance channel data SD_UV2. In this embodiment, the frame size of the source data SD_2 is larger than that of the source data SD_1, and the data size of the source chrominance channel data SD_UV2 is larger than that of the source chrominance channel data SD_UV1.

The bitstream BS_1 may be an entropy encoder output of the video encoder 206_1, and the bitstream BS_2 may be an entropy encoder output of the video encoder 206_2. For example, the video encoders 206_1 and 206_2 may be different hardware video encoders, such that the source data SD_1 and SD_2 may be processed in a parallel manner. For another example, the video encoders 206_1 and 206_2 may be the same hardware video encoder, such that the source data SD_1 and SD_2 may be processed in a time-division multiplexing manner. The bitstreams BS_1 and BS_2 may be generated from the video encoding circuit 202 using the same hardware video encoder or different hardware video encoders, depending upon actual design considerations. To put it simply, the present invention has no limitations on actual implementation of the video encoding circuit 202. Any means capable of generating the bitstream BS_1 from encoding the source data SD_1 and generating the bitstream BS_2 from encoding the source data SD_2 can be adopted by the video encoding circuit 202. The bitstream BS_1 output from the video encoder 206_1 includes a compressed luminance channel data SE_Y1 and a compressed chrominance channel data SE UV1. The bitstream BS_2 output from the video encoder 206_2 includes a compressed luminance channel data SE_Y2 and a compressed chrominance channel data SE_UV2. More specifically, the compressed luminance channel data SE_Y1 is luminance syntax data (i.e., syntax elements obtained from video compression of the source luminance channel data SD_Y1) that is entropy encoded and carried by the bitstream BS_1, the compressed chrominance channel data SE UV1 is chrominance syntax data (i.e., syntax elements obtained from video compression of the source chrominance channel data SD_UV1) that is entropy encoded and carried by the bitstream BS_1, the compressed luminance channel data SE_Y2 is luminance syntax data (i.e., syntax elements obtained from video compression of the source luminance channel data SD_Y2) that is entropy encoded and carried by the bitstream BS_2, and the compressed chrominance channel data SE_UV2 is chrominance syntax data (i.e., syntax elements obtained from video compression of the source chrominance channel data SD_UV2) that is entropy encoded and carried by the bitstream BS_2. For example, the luminance syntax data may include syntax elements of at least one of intra/inter prediction mode, residual data and block partition data of the luminance channel Y, and the chrominance syntax data may include syntax elements of at least one of intra/inter prediction mode, residual data and block partition data of the chrominance channel UV.

In this embodiment, the bitstream BS_2 serves as the auxiliary input AUX_IN shown in FIG. 1, and the compressed chrominance channel data (chrominance syntax data) SE_UV2 that is entropy encoded and carried by the bitstream BS_2 serves as the auxiliary compressed chrominance channel data (chrominance syntax data) AUX_UV shown in FIG. 1. The post-processing circuit 204 is used to generate and output an output bitstream BS_3 (BS_OUT=BS_3) with a chroma subsampling format not supported by the hardware video encoder 206_1/206_2. That is, the chroma subsampling format of the output bitstream BS_3 is different from that of the source data SD_1/SD_2. In this embodiment, the post-processing circuit 204 performs entropy decoding upon the bitstream BS_1 to parse the compressed luminance channel data (luminance syntax data) SE_Y1 from the bitstream BS_1, performs entropy decoding upon the bitstream BS_2 to parse the compressed chrominance channel data (chrominance syntax data) SE_UV2 from the bitstream BS_2, generates a coding-standard-compliant syntax data D_SE1 (i.e., syntax data that is in compliance with a target video coding standard such as H.264, H265, or other standard as required) that includes the compressed luminance channel data SE_Y1 and the compressed chrominance channel data SE_UV2, and performs entropy encoding upon the coding-standard-compliant syntax data D_SE1 to generate the output bitstream BS_3. The compressed luminance channel data SE_Y1 and the compressed chrominance channel data SE_UV2 are entropy encoded and carried by the output bitstream BS_3. For example, the coding-standard-compliant syntax data D_SE1 is converted to bin data, and the bin data is converted to bit data of the output bitstream BS_3.

In some embodiments of the present invention, there may be certain coordination between encoding of the source data SD_1 and encoding of the source data SD_2 to ensure that a combination of compressed luminance channel data (luminance syntax data) SE_Y1 and compressed chrominance channel data (chrominance syntax data) SE_UV2 can be compatible with the target video coding standard. For example, according to the coordination between encoding of the source data SD_1 and encoding of the source data SD_2, encoding of a block in the source data SD_1 and encoding of the block in the source data SD_2 may adopt the same prediction mode, the same quantization parameter, the same block partition, or a combination thereof.

Consider a first case where the chroma subsampling format of the source data SD_1 and SD_2 is YUV 4:2:0. The frame width W1 of the source data SD_2 is the same as the frame width W2 of the source data SD_1 (i.e., W2=W1), and the frame height H2 of the source data SD_2 is twice as large as the frame height H1 of the source data SD_1 (i.e., H2=2×H1). Hence, from source data SD 1's viewpoint, the source data SD_2 has an equivalent chroma subsampling format being 4:2:2. When the compressed luminance channel data SE_Y1 is combined with the compressed chrominance channel data SE_UV2, the chroma subsampling format being 4:2:2 can be obtained. In this way, the output bitstream BS_3 with the chroma subsampling format being 4:2:2 can be generated under the condition that the hardware video encoder 206_1/206_2 is designed to support the chroma subsampling format YUV 4:2:0 and does not support the chroma subsampling format YUV 4:2:2.

Consider a second case where the chroma subsampling format of the source data SD_1 and SD_2 is YUV 4:2:0. The frame width W1 of the source data SD_2 is twice as large as the frame width W2 of the source data SD_1 (i.e., W2=2× W1), and the frame height H2 of the source data SD_2 is twice as large as the frame height H1 of the source data SD_1 (i.e., H2=2×H1). Hence, from source data SD 1's viewpoint, the source data SD_2 has an equivalent chroma subsampling format being 4:4:4. When the compressed luminance channel data SE_Y1 is combined with the compressed chrominance channel data SE_UV2, the chroma subsampling format being 4:4:4 can be obtained. In this way, the output bitstream BS_3 with the chroma subsampling format being 4:4:4 can be generated under the condition that the hardware video encoder 206_1/206_2 is designed to support the chroma subsampling format YUV 4:2:0 and does not support the chroma subsampling format YUV 4:4:4.

Consider a third case where the chroma subsampling format of the source data SD_1 and SD_2 is YUV 4:2:2. The frame width W1 of the source data SD_2 is twice as large as the frame width W2 of the source data SD_1 (i.e., W2=2× W1), and the frame height H2 of the source data SD_2 is the same as the frame height H1 of the source data SD_1 (i.e., H2=H1). Hence, from source data SD 1's viewpoint, the source data SD_2 has an equivalent chroma subsampling format being 4:4:4. When the compressed luminance channel data SE_Y1 is combined with the compressed chrominance channel data SE_UV2, the chroma subsampling format being 4:4:4 can be obtained. In this way, the output bitstream BS_3 with the chroma subsampling format being 4:4:4 can be generated under the condition that the hardware video encoder 206_1/206_2 is designed to support the chroma subsampling format YUV 4:2:2 and does not support the chroma subsampling format YUV 4:4:4.

Figure 3:
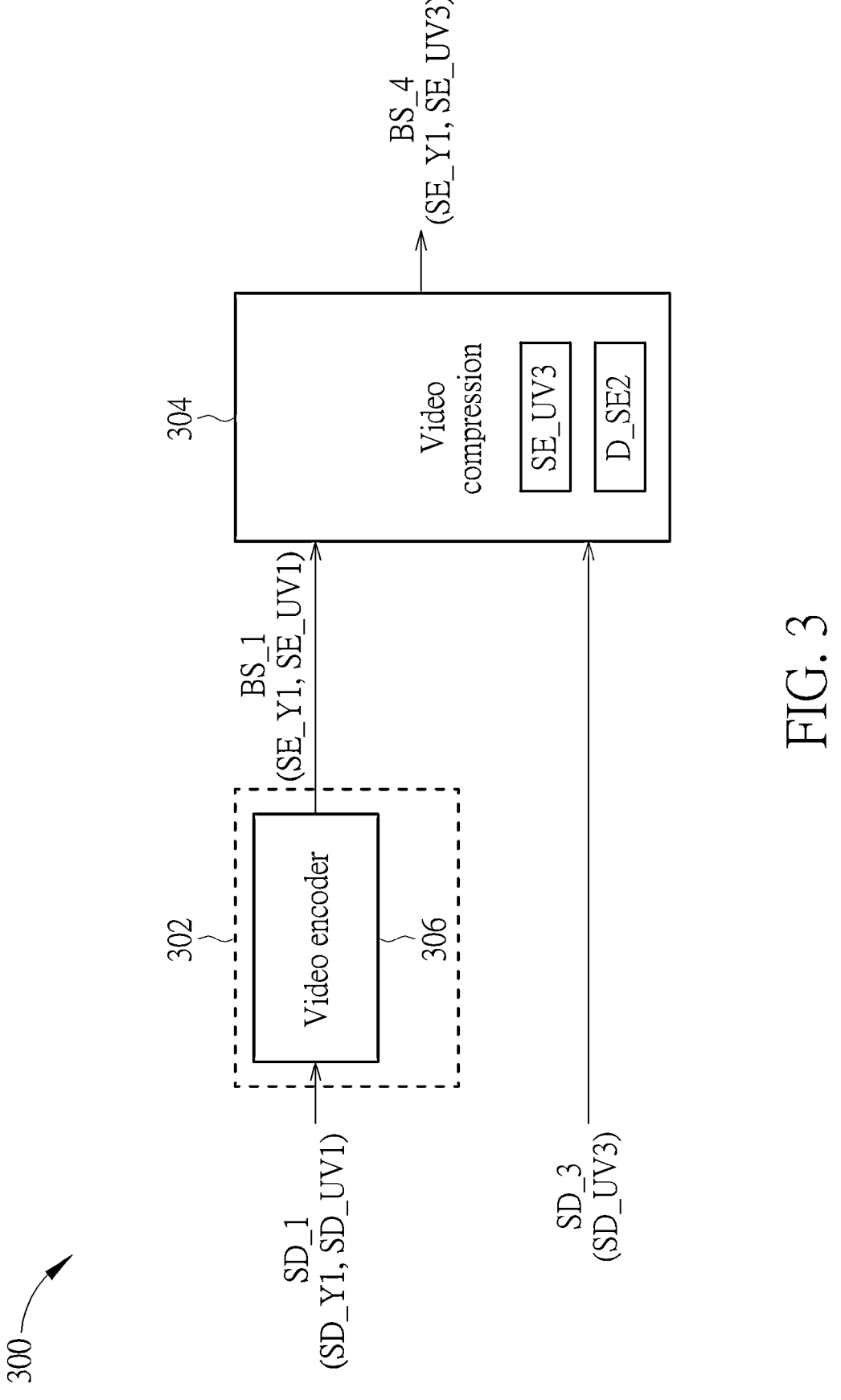
FIG. 3 is a diagram illustrating a second video processing apparatus capable of generating an output bitstream with a chroma subsampling format not supported by a hardware video encoder according to an embodiment of the present invention.

FIG. 3 is a diagram illustrating a second video processing apparatus capable of generating an output bitstream with a chroma subsampling format not supported by a hardware video encoder according to an embodiment of the present invention. The architecture of the video processing apparatus 300 is based on that of the video processing apparatus 100. As shown in FIG. 3, the video processing apparatus 300 includes a video encoding circuit 302 and a post-processing circuit (labeled by "video compression") 304. The video encoding circuit 102 shown in FIG. 1 may be implemented using the video encoding circuit 302, and the post-processing circuit 104 shown in FIG. 1 may be implemented using the post-processing circuit 304. The video encoding circuit 302 receives a source data SD_1, and encodes the source data SD_1 to generate a bitstream BS_1. The source data SD_1 includes a source luminance channel data SD_Y1 and a source chrominance channel data SD_UV1. The bitstream BS_1 may be an entropy encoder output of the video encoder (which is a hardware video encoder) 306. Hence, the bitstream BS_1 output from the video encoder 306 includes a compressed luminance channel data SE_Y1 and a compressed chrominance channel data SE UV1. More specifically, the compressed luminance channel data SE_Y1 is luminance syntax data (i.e., syntax elements obtained from video compression of the source luminance channel data SD_Y1) that is entropy encoded and carried by the bitstream BS_1, and the compressed chrominance channel data SE UV1 is chrominance syntax data (i.e., syntax elements obtained from video compression of the source chrominance channel data SD_UV1) that is entropy encoded and carried by the bitstream BS_1. For example, the luminance syntax data may include syntax elements of at least one of intra/inter prediction mode, residual data and block partition data of the luminance channel Y, and the chrominance syntax data may include syntax elements of at least one of intra/inter prediction mode, residual data and block partition data of the chrominance channel UV.

The post-processing circuit 304 receives the bitstream BS_1 and a source data SD_3. In this embodiment, the source data SD_3 includes source chrominance channel data SD_UV3 only. Hence, compared to the source data SD_1, the source data SD_3 has no source luminance data. The source data SD_1 and SD_3 may have different frame sizes (e.g., different frame widths and/or different frame heights) in the chrominance channel UV. For example, the frame size of the source data SD_3 in the chrominance channel may be larger than that of the source data SD_1 in the chrominance channel. In addition, both of the source data SD_1 and SD_3 may correspond to the same scene captured by a camera system, and may be obtained from the same ISP of the camera system. In some embodiments, the source data SD_3 may not be sub-sampled.

In this embodiment, the source data SD_3 serves as the auxiliary input AUX_IN shown in FIG. 1, and the post-processing circuit 304 encodes the source data SD_3 to generate compressed chrominance channel data SE_UV3 as the auxiliary compressed chrominance channel data AUX_UV shown in FIG. 1. For example, the compressed chrominance channel data SE_UV3 is luminance syntax data that may include syntax elements of at least one of intra/inter prediction mode, residual data and block partition data of the chrominance channel UV.

The post-processing circuit 304 is used to generate and output an output bitstream BS_4 (BS_OUT=BS_4) with a chroma subsampling format not supported by the hardware video encoder 306. That is, the chroma subsampling format of the output bitstream BS_4 is different from that of the source data SD_1. In this embodiment, the post-processing circuit 304 performs entropy decoding upon the bitstream BS_1 to parse the compressed luminance channel data (luminance syntax data) SE_Y1 from the bitstream BS_1, encodes the source data SD_3 to generate the compressed chrominance channel data (chrominance syntax data) SE_UV3, generates a coding-standard-compliant syntax data D_SE2 (i.e., syntax data that is in compliance with a target video coding standard such as H.264, H265, or other standard as required) that includes the compressed luminance channel data SE_Y1 and the compressed chrominance channel data SE_UV3, and performs entropy encoding upon the coding-standard-compliant syntax data D_SE2 to generate the output bitstream BS_4. The compressed luminance channel data SE_Y1 and the compressed chrominance channel data SE_UV3 are entropy encoded and carried by the output bitstream BS_4. For example, the coding-standard-compliant syntax data D_SE2 is converted to bin data, and the bin data is converted to bit data of the output bitstream BS_4.

To ensure that compressed chrominance channel data (chrominance syntax data) SE_UV3 is in compliance with the target video coding standard and/or decrease the encoding effort of the source data SD_3, the post-processing circuit 304 is further configured to reuse information derived from the compressed luminance channel data (luminance syntax data) when encoding the source data SD_3 to produce the compressed chrominance channel data (chrominance syntax data) SE_UV3. For example, if a block in the compressed luminance channel data SE_Y1 is encoded with intra prediction mode, the reconstructed luminance pixel data derived from the compressed luminance channel data SE_Y1 may be reused to encode the chrominance channel data of the block of the source data SD_3 under a chroma intra prediction mode (e.g., cross-component prediction mode). For another example, if a block in the compressed luminance channel data SE_Y1 is encoded with inter prediction mode, the motion vector (MV) information of the compressed luminance channel data SE_Y1 may be reused to encode the chrominance channel data of the block of the source data SD_3. For another example, the quantization parameter (QP) of the compressed luminance channel data SE_Y1 may be reused to perform the quantization process when encoding the chrominance channel data of the source data SD_3. For another example, the block partition information of the compressed luminance channel data SE_Y1 may be reused to perform the block size partition process when encoding the chrominance channel data of the source data SD_3.

Consider a first case where the chroma subsampling format of the source data SD_1 is YUV 4:2:0. With the help of the source data SD_3 (which includes source chrominance channel data SD_UV3 with a data size larger than that of the source chrominance channel data SD_UV1), the chroma subsampling format being 4:2:2 can be obtained when the compressed luminance channel data SE_Y1 is combined with the compressed chrominance channel data SE_UV3. In this way, the output bitstream BS_4 with the chroma subsampling format being 4:2:2 can be generated under the condition that the hardware video encoder 306 is designed to support the chroma subsampling format YUV 4:2:0 and does not support the chroma subsampling format YUV 4:2:2.

Consider a second case where the chroma subsampling format of the source data SD_1 is YUV 4:2:0. With the help of the source data SD_3 (which includes source chrominance channel data SD_UV3 with a data size larger than that of the source chrominance channel data SD_UV1), the chroma subsampling format being 4:4:4 can be obtained when the compressed luminance channel data SE_Y1 is combined with the compressed chrominance channel data SE_UV3. In this way, the output bitstream BS_4 with the chroma subsampling format being 4:4:4 can be generated under the condition that the hardware video encoder 306 is designed to support the chroma subsampling format YUV 4:2:0 and does not support the chroma subsampling format YUV 4:4:4.

Consider a third case where the chroma subsampling format of the source data SD_1 is YUV 4:2:2. With the help of the source data SD_3 (which includes source chrominance channel data SD_UV3 with a data size larger than that of the source chrominance channel data SD_UV1), the chroma subsampling format being 4:4:4 can be obtained when the compressed luminance channel data SE_Y1 is combined with the compressed chrominance channel data SE_UV3. In this way, the output bitstream BS_4 with the chroma subsampling format being 4:4:4 can be generated under the condition that the hardware video encoder 306 is designed to support the chroma subsampling format YUV 4:2:2 and does not support the chroma subsampling format YUV 4:4:4.

Figure 4:
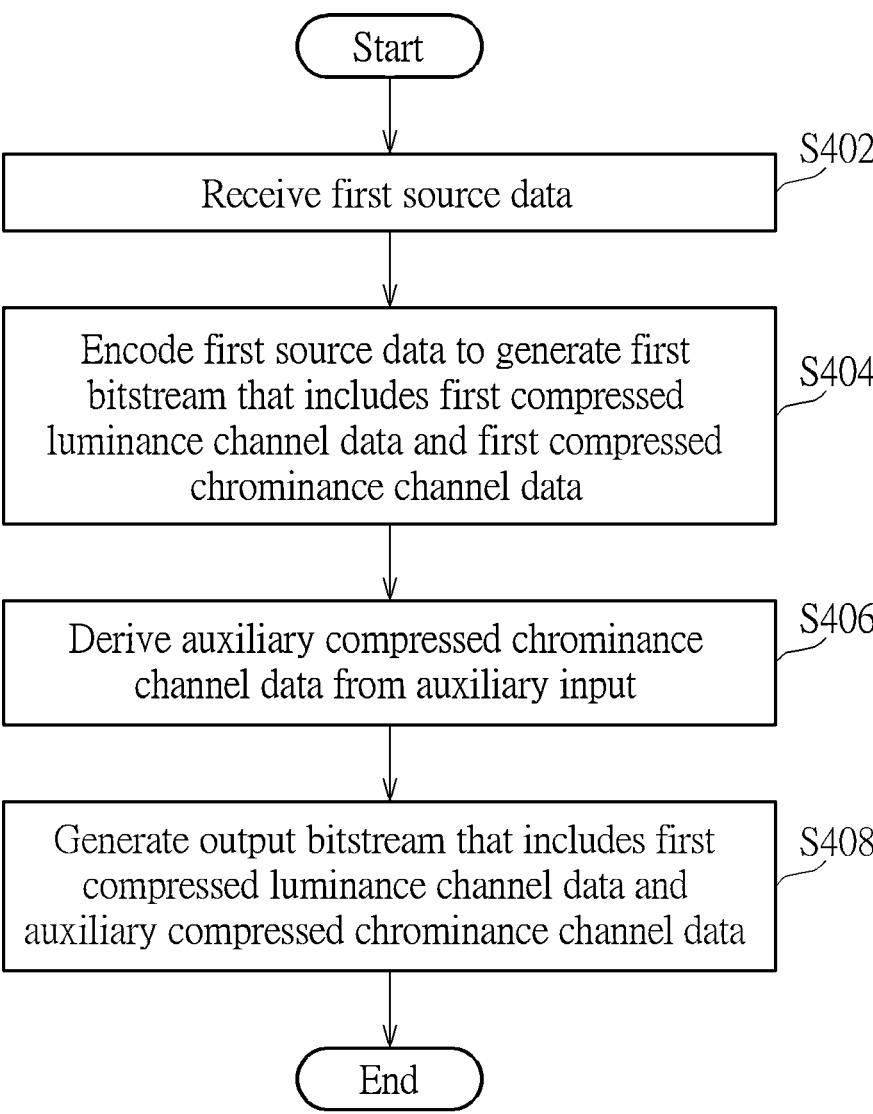
FIG. 4 is a flowchart of a video processing method according to an embodiment of the present invention.

FIG. 4 is a flowchart of a video processing method according to an embodiment of the present invention. For example, the video processing method may be employed by the video processing apparatus 100/200/300. Provided that the result is substantially the same, the steps are not required to be executed in the exact order shown in FIG. 4. At step S402, a first source data is received, wherein the first source data includes a first source luminance channel data and a first source chrominance channel data. At step S404, the first source data is encoded to generate a first bitstream, wherein the first bitstream includes a first compressed luminance channel data and a first compressed chrominance channel data. At step S406, an auxiliary compressed chrominance channel data is derived from an auxiliary input. At step S408, an output bitstream that includes the first compressed luminance channel data and the auxiliary compressed chrominance channel data is generated and output. As a person skilled in the pertinent can readily understand details of each step after reading above paragraphs directed to the video processing apparatus 100/200/300, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing apparatus comprising:
   a video encoding circuit, configured to receive a first source data, and encode the first source data to generate a first bitstream, wherein the first source data comprises a first source luminance channel data and a first source chrominance channel data, and the first bitstream comprises a first compressed luminance channel data and a first compressed chrominance channel data; and
   a post-processing circuit, configured to derive an auxiliary compressed chrominance channel data from an auxiliary input, and generate and output an output bitstream that comprises the first compressed luminance channel data and the auxiliary compressed chrominance channel data;
   wherein the video encoding circuit is further configured to receive a second source data, and encode the second source data to generate a second bitstream, where the second source data comprises a second source luminance channel data and a second source chrominance channel data, and the second bitstream comprises a second compressed luminance channel data and a second compressed chrominance channel data; and the second bitstream is the auxiliary input, and the second compressed chrominance channel data is the auxiliary compressed chrominance channel data.

2. The video processing apparatus of claim 1, wherein a chroma subsampling format of the output bitstream is different from a chroma subsampling format of the first source data.

3. The video processing apparatus of claim 1, wherein the post-processing circuit is further configured to:
   perform entropy decoding upon the first bitstream to parse the first compressed luminance channel data from the first bitstream; and perform entropy decoding upon the second bitstream to parse the second compressed chrominance channel data from the second bitstream.

4. The video processing apparatus of claim 3, wherein the post-processing circuit is further configured to:
   generate a coding-standard-compliant syntax data that comprises the first compressed luminance channel data and the auxiliary compressed chrominance channel data; and
   perform entropy encoding upon the coding-standard-compliant syntax data to generate the output bitstream.

5. The video processing apparatus of claim 1, wherein the first source data and the second source data have a same chroma subsampling format but different frame sizes.

6. The video processing apparatus of claim 1, wherein there is coordination between encoding of the first source data and encoding of the second source data.

7. The video processing apparatus of claim 6, wherein according to the coordination between encoding of the first source data and encoding of the second source data, encoding of a block in the first source data and encoding of the block in the second source data adopt a same prediction mode, a same quantization parameter, a same block partition, or a combination thereof.

8. A video processing apparatus comprising:
   a video encoding circuit, configured to receive a first source data, and encode the first source data to generate a first bitstream, wherein the first source data comprises a first source luminance channel data and a first source chrominance channel data, and the first bitstream comprises a first compressed luminance channel data and a first compressed chrominance channel data; and
   a post-processing circuit, configured to derive an auxiliary compressed chrominance channel data from an auxiliary input, and generate and output an output bitstream that comprises the first compressed luminance channel data and the auxiliary compressed chrominance channel data;
   wherein the auxiliary input is a second source data that comprises source chrominance channel data only, and the post-processing circuit is further configured to encode the second source data to generate the auxiliary compressed chrominance channel data, and perform entropy decoding upon the first bitstream to parse the first compressed luminance channel data from the first bitstream.

9. The video processing apparatus of claim 8, wherein the post-processing circuit is further configured to:
   generate a coding-standard-compliant syntax data that comprises the first compressed luminance channel data and the auxiliary compressed chrominance channel data; and
   perform entropy encoding upon the coding-standard-compliant syntax data to generate the output bitstream.

10. The video processing apparatus of claim 8, wherein the post-processing circuit is further configured to reuse information derived from the first compressed luminance channel data when encoding the second source data.

11. A video processing method comprising:
   receiving a first source data;
   encoding the first source data to generate a first bitstream, wherein the first source data comprises a first source luminance channel data and a first source chrominance channel data, and the first bitstream comprises a first compressed luminance channel data and a first compressed chrominance channel data;

deriving an auxiliary compressed chrominance channel data from an auxiliary input; and generating and outputting an output bitstream that comprises the first compressed luminance channel data and the auxiliary compressed chrominance channel data;

wherein deriving the auxiliary compressed chrominance channel data from the auxiliary input comprises:

receiving a second source data; and encoding the second source data to generate a second bitstream;

wherein the second source data comprises a second source luminance channel data and a second source chrominance channel data, and the second bitstream comprises a second compressed luminance channel data and a second compressed chrominance channel data; and the second bitstream is the auxiliary input, and the second compressed chrominance channel data is the auxiliary compressed chrominance channel data.

12. The video processing method of claim 11, wherein a chroma subsampling format of the output bitstream is different from a chroma subsampling format of the first source data.

13. The video processing method of claim 11, wherein generating and outputting the output bitstream comprises:

performing entropy decoding upon the first bitstream to parse the first compressed luminance channel data from the first bitstream; and performing entropy decoding upon the second bitstream to parse the second compressed chrominance channel data from the second bitstream.

14. The video processing method of claim 13, wherein generating and outputting the output bitstream further comprises:

generating a coding-standard-compliant syntax data that comprises the first compressed luminance channel data and the auxiliary compressed chrominance channel data; and performing entropy encoding upon the coding-standard-compliant syntax data to generate the output bitstream.

15. The video processing method of claim 11, wherein the first source data and the second source data have a same chroma subsampling format but different frame sizes.

16. The video processing method of claim 11, wherein there is coordination between encoding of the first source data and encoding of the second source data.

17. The video processing method of claim 16, wherein according to the coordination between encoding of the first source data and encoding of the second source data, encoding of a block in the first source data and encoding of the block in the second source data adopt a same prediction mode, a same quantization parameter, a same block partition, or a combination thereof.

18. A video processing method comprising:

receiving a first source data;

encoding the first source data to generate a first bitstream, wherein the first source data comprises a first source luminance channel data and a first source chrominance channel data, and the first bitstream comprises a first compressed luminance channel data and a first compressed chrominance channel data;

deriving an auxiliary compressed chrominance channel data from an auxiliary input; and generating and outputting an output bitstream that comprises the first compressed luminance channel data and the auxiliary compressed chrominance channel data;

wherein the auxiliary input is a second source data that comprises source chrominance channel data only, deriving the auxiliary compressed chrominance channel data from the auxiliary input comprises:

encoding the second source data to generate the auxiliary compressed chrominance channel data;

generating and outputting the output bitstream comprises:

performing entropy decoding upon the first bitstream to parse the first compressed luminance channel data from the first bitstream.

19. The video processing method of claim 18, wherein generating and outputting the output bitstream further comprises:

generating a coding-standard-compliant syntax data that comprises the first compressed luminance channel data and the auxiliary compressed chrominance channel data; and performing entropy encoding upon the coding-standard-compliant syntax data to generate the output bitstream.

20. The video processing method of claim 18, wherein encoding the second source data to generate the auxiliary compressed chrominance channel data comprises:

when encoding the second source data, reusing information derived from the first compressed luminance channel data.

* * * * *